US010728358B2

(12) United States Patent
Dhanabalan et al.

(10) Patent No.: US 10,728,358 B2
(45) Date of Patent: Jul. 28, 2020

(54) METHOD TO COMPUTE THE TRADEOFF BETWEEN USER EXPERIENCE FROM PREFETCHING VERSUS THE BANDWIDTH CONSTRAINTS/COST AT THE CLOUD SERVICE

(71) Applicant: Citrix Systems, Inc., Fort Lauderdale, FL (US)

(72) Inventors: Praveen Raja Dhanabalan, Bengaluru (IN); Saurabh Pant, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 152 days.

(21) Appl. No.: 15/878,911

(22) Filed: Jan. 24, 2018

(65) Prior Publication Data

US 2019/0230185 A1    Jul. 25, 2019

(51) Int. Cl.
G06F 15/16 (2006.01)
H04L 29/08 (2006.01)
H04L 12/14 (2006.01)

(52) U.S. Cl.
CPC ...... *H04L 67/2847* (2013.01); *H04L 12/1407* (2013.01)

(58) Field of Classification Search
CPC ............ H04L 67/2847; H04L 12/1407; H04L 29/08729; H04L 29/08801; H04L 29/08891; H04L 29/12811; H04L 37/2842; H04L 67/1097; H04L 67/2885; G06F 12/0862; G06F 12/0866; G06F 16/9574

USPC ................. 709/203, 223, 224, 213
See application file for complete search history.

(56) References Cited

U.S. PATENT DOCUMENTS

| 8,209,429 | B2 * | 6/2012 | Jacobs | H04N 21/234327 709/231 |
| 8,255,528 | B2 * | 8/2012 | Raja | H04L 67/1029 709/223 |
| 8,275,871 | B2 * | 9/2012 | Ram | G06F 9/5083 709/223 |
| 9,300,535 | B2 * | 3/2016 | Popli | H04L 41/0853 |
| 10,212,089 | B1 * | 2/2019 | Narayanan | H04L 47/125 |
| 2002/0110084 | A1 * | 8/2002 | Butt | H04L 47/10 370/230 |
| 2005/0267928 | A1 * | 12/2005 | Anderson | H04L 41/28 709/200 |
| 2006/0187833 | A1 * | 8/2006 | Montulli | H04L 41/0896 370/230 |
| 2010/0088398 | A1 * | 4/2010 | Plamondon | H04L 67/28 709/220 |
| 2010/0246602 | A1 * | 9/2010 | Barreto | H04L 49/90 370/466 |
| 2010/0250767 | A1 * | 9/2010 | Barreto | H04L 69/16 709/231 |

(Continued)

*Primary Examiner* — Thu Ha T Nguyen
(74) *Attorney, Agent, or Firm* — Foley & Lardner LLP

(57) ABSTRACT

The systems and methods discussed herein provide for faster access to frequently utilized resources through intelligent bandwidth usage-based content pre-fetching. An intelligent acceleration and caching device may monitor bandwidth utilization over a time period and create a regression-based model to predict bandwidth utilization in subsequent time periods. When predicted utilization is below a threshold, the device may pre-fetch frequently accessed content, providing low-latency access and faster performance, without exceeding connection allocation limits.

18 Claims, 3 Drawing Sheets

(56) References Cited

U.S. PATENT DOCUMENTS

| | | |
|---|---|---|
| 2019/0014055 A1* | 1/2019 | Gupta ................... H04L 47/50 |
| 2019/0014088 A1* | 1/2019 | Subramaniyan .... H04L 65/1069 |
| 2019/0036788 A1* | 1/2019 | Gupta ................ H04L 43/0882 |
| 2019/0230185 A1* | 7/2019 | Dhanabalan ........ H04L 12/1407 |
| 2019/0238504 A1* | 8/2019 | Gupta ................ H04L 61/1511 |
| 2019/0319873 A1* | 10/2019 | Shelar .................... H04L 45/24 |
| 2020/0014619 A1* | 1/2020 | Shelar .................... H04L 45/38 |
| 2020/0014639 A1* | 1/2020 | Dhanabalan .......... H04L 49/501 |
| 2020/0036699 A1* | 1/2020 | Suresh ................ H04L 63/0884 |

* cited by examiner

METHOD TO COMPUTE THE TRADEOFF BETWEEN USER EXPERIENCE FROM PREFETCHING VERSUS THE BANDWIDTH CONSTRAINTS/COST AT THE CLOUD SERVICE

FIELD OF THE DISCLOSURE

The present application generally relates to pre-fetching and locally caching content.

BACKGROUND OF THE DISCLOSURE

Many Internet access plans include data caps or limits over a predetermined time period, such as a predetermined amount of data per month. Typically, if these limits are exceeded, further data may be delivered, but at drastically increased prices or at significantly reduced speeds.

Additionally, network access to frequently utilized resources may be accelerated and latency reduced by pre-fetching the resources and caching them at a local device (e.g. in a cache of a router or gateway or client device).

Thus, pre-fetching data may increase access speed and improve performance of the devices and network. However, pre-fetching data may quickly consume allocated connection limits. Even if pre-fetching is stopped upon reaching or approaching the connection limit, normal network usage for the remainder of the time period may result in the limit being exceeded, resulting in increased costs, reduced access speeds, and other limitations. Accordingly, pre-fetching-based acceleration may ironically result in slower access.

BRIEF SUMMARY OF THE DISCLOSURE

The systems and methods discussed herein provide for faster access to frequently utilized resources through intelligent bandwidth usage-based content pre-fetching. An intelligent acceleration and caching device, which may be deployed as a single device, cluster of devices, cloud of virtual devices, or any other such deployment implementation, may monitor bandwidth utilization over a time period and create a regression-based model to predict bandwidth utilization in subsequent time periods. When predicted utilization is below a threshold, the device may pre-fetch frequently accessed content, providing low-latency access and faster performance, without exceeding connection allocation limits.

In one aspect, the present disclosure is directed to a system for bandwidth usage-based content pre-fetching by a cache manager. The system includes a network device comprising a storage device, a network interface in communication with one or more client devices, a connection monitor, and a cache manager. The connection monitor is configured to measure bandwidth used by the one or more client devices during a first predetermined time period. The cache manager is configured to identify a difference between the measured bandwidth used by the one or more client devices during the first predetermined time period and a predetermined bandwidth limit; and pre-fetch, during a second predetermined time period, an amount of data corresponding to the identified difference, the pre-fetched data stored in the storage device to be provided to the one or more client devices.

In some implementations, the cache manager is further configured to, iteratively for a plurality of subsequent predetermined time periods: identify a further difference between the measured bandwidth used by the one or more client devices during a prior predetermined time period and the predetermined bandwidth limit; and pre-fetch, during said subsequent predetermined time period, an amount of data corresponding to the identified further difference.

In some implementations, the cache manager is further configured to determine a predicted difference between the measured bandwidth used by the one or more client devices during the first predetermined time period and the predetermined bandwidth limit, based on a measured bandwidth used by the one or more client devices during one or more predetermined time periods. The cache manager is also configured to calculate a prediction error between the predicted difference and the identified difference. The cache manager is also configured to pre-fetch the amount of data corresponding to the identified difference, responsive to the calculated prediction error being less than a threshold. In a further implementation, the cache manager is further configured to determine the predicted difference via a regression model incorporating the measured bandwidth used by the one or more client devices during each of the one or more predetermined time periods.

In some implementations, the cache manager is further configured to select data for pre-fetching from a set of data frequently requested by the one or more client devices. In some implementations, the cache manager is further configured to select data for pre-fetching from a predetermined set of data for which the one or more client devices are authorized to access. In some implementations, the connection monitor is further configured to monitor a number of files accessed by the one or more client devices during the first predetermined time period; and wherein the cache manager is further configured to select data for pre-fetching based on the number of files accessed by the one or more client devices. In some implementations, the connection monitor is further configured to monitor a total size of data accessed by the one or more client devices during the first predetermined time period; and wherein the cache manager is further configured to identify the difference between the measured bandwidth and the predetermined bandwidth limit based on the total size of data accessed during the first predetermined time period and a predetermined data limit. In some implementations, the network device is deployed as an intermediary between the one or more client devices and one or more servers. In some implementations, the connection monitor is configured to receive bandwidth measurements for the one or more client devices from a second device.

In another aspect, the present disclosure is directed to a method for bandwidth usage-based content pre-fetching by a cache manager. The method includes measuring bandwidth used by one or more client devices during a first predetermined time period, by a connection monitor of a network device in communication with the one or more client devices. The method also includes identifying, by a cache manager of the network device, a difference between the measured bandwidth used by the one or more client devices during the first predetermined time period and a predetermined bandwidth limit. The method also includes pre-fetching, by the cache manager during a second predetermined time period, an amount of data corresponding to the identified difference, the pre-fetched data stored in a storage device of the network device to be provided to the one or more client devices.

In some implementations, the method includes iteratively for a plurality of subsequent predetermined time periods: identifying, by the cache manager, a further difference between the measured bandwidth used by the one or more client devices during a prior predetermined time period and the predetermined bandwidth limit; and pre-fetching, by the cache manager, during said subsequent predetermined time period, an amount of data corresponding to the identified further difference.

In some implementations, the method includes determining, by the cache manager, a predicted difference between the measured bandwidth used by the one or more client devices during the first predetermined time period and the predetermined bandwidth limit, based on a measured bandwidth used by the one or more client devices during one or more predetermined time periods; calculating, by the cache manager, a prediction error between the predicted difference and the identified difference; and pre-fetching, by the cache manager, the amount of data corresponding to the identified difference, responsive to the calculated prediction error being less than a threshold. In a further implementation, the method includes determining, by the cache manager, the predicted difference via a regression model incorporating the measured bandwidth used by the one or more client devices during each of the one or more predetermined time periods.

In some implementations, the method includes selecting, by the cache manager, data for pre-fetching from a set of data frequently requested by the one or more client devices. In some implementations, the method includes selecting, by the cache manager, data for pre-fetching from a predetermined set of data for which the one or more client devices are authorized to access. In some implementations, the method includes monitoring, by the connection manager, a number of files accessed by the one or more client devices during the first predetermined time period; and selecting, by the cache manager, data for pre-fetching based on the number of files accessed by the one or more client devices.

In some implementations, the method includes monitoring, by the connection monitor, a total size of data accessed by the one or more client devices during the first predetermined time period; and identifying, by the cache manager, the difference between the measured bandwidth and the predetermined bandwidth limit based on the total size of data accessed during the first predetermined time period and a predetermined data limit.

In some implementations, the network device is deployed as an intermediary between the one or more client devices and one or more servers. In some implementations, the method includes receiving, by the connection monitor, bandwidth measurements for the one or more client devices from a second device.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
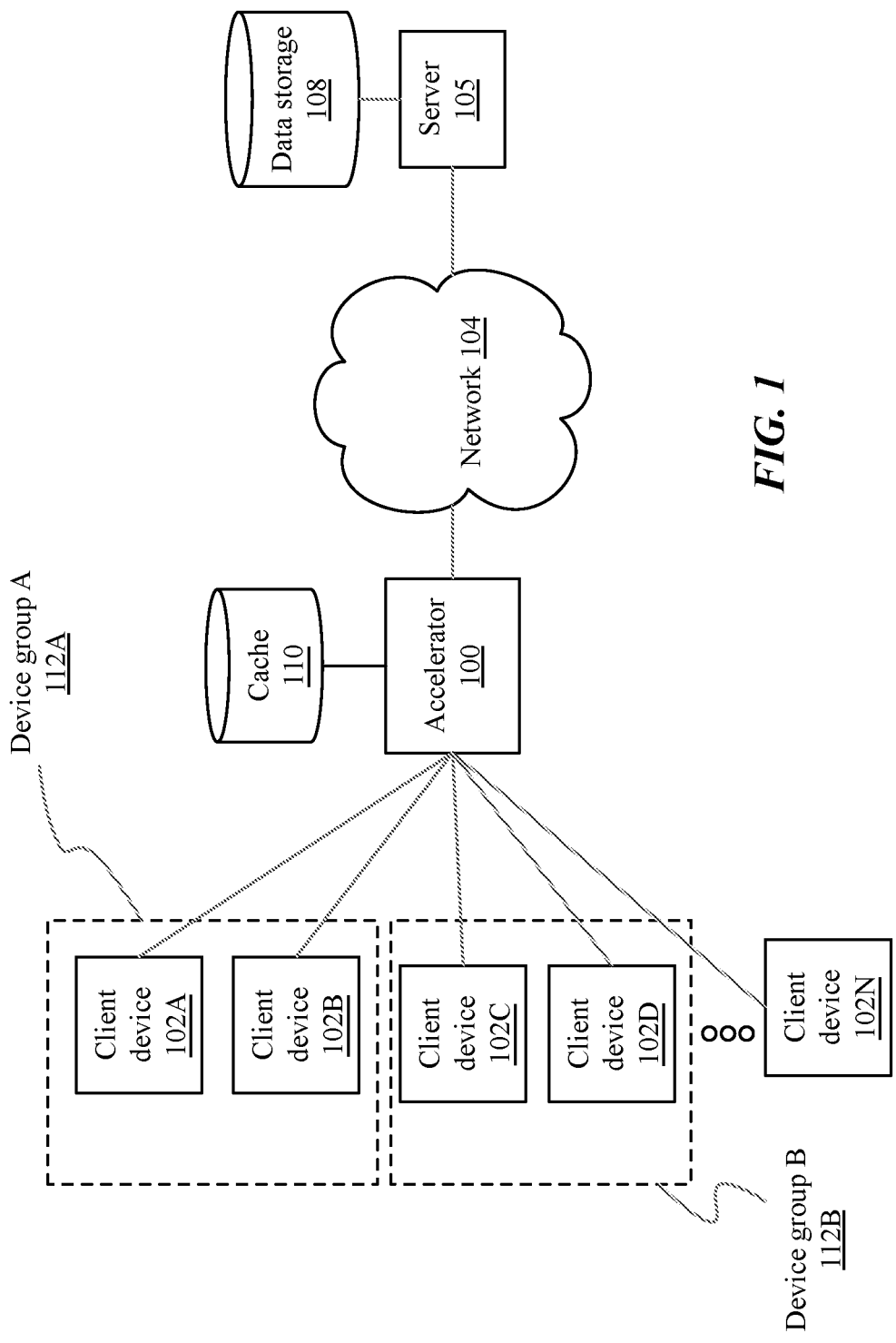
FIG. 1 is a block diagram illustrating an implementation of a network environment for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Many Internet access plans include data caps or limits over a predetermined time period, such as a predetermined amount of data (e.g. 100 GB) per month. Typically, if these limits are exceeded, further data may be delivered, but at drastically increased prices. For example, in many implementations, a broadband connection may be provided with a limit of 100 GB/month for a flat fee; and then an additional fee charged for each GB or portion thereof provided during the monthly cycle. In many implementations, access speeds may be reduced or throttled in response to exceeding the connection limit. For example, a connection may provide 400 Mbps of data until a predetermined data limit is reached for the time period, and then the connection may be throttled to only provide 40 Mbps of data.

Simultaneously, network access to frequently utilized resources may be accelerated and latency reduced by pre-fetching the resources and caching them at a local device (e.g. in a cache of a router or gateway or client device). For example, access to the pre-fetched data in the cache may have latencies on the order of milliseconds or even nanoseconds, for caches in the accessing device; by comparison, access to the same data at a remote content server may take seconds or longer.

Thus, pre-fetching data may increase access speed and improve performance of the devices and network. But pre-fetching data may quickly consume allocated connection limits. Even if pre-fetching is stopped upon reaching or approaching the connection limit, normal network usage for the remainder of the time period may result in the limit being exceeded, resulting in increased costs, reduced access speeds, and other limitations. Accordingly, pre-fetching-based acceleration may ironically result in slower access.

The systems and methods discussed herein provide for faster access to frequently utilized resources through intelligent bandwidth usage-based content pre-fetching. An intelligent acceleration and caching device may monitor bandwidth utilization over a time period and create a regression-based model to predict bandwidth utilization in subsequent time periods. When predicted utilization is below a threshold, the device may pre-fetch frequently accessed content, providing low-latency access and faster performance, without exceeding connection allocation limits.

FIG. 1A is a block diagram illustrating an implementation of a network environment for bandwidth usage-based content pre-fetching. As shown, an accelerator device 100 may connect via a network 104 to one or more servers 105 and one or more client devices 102A-102N (referred to generally as client device(s) 102). Accelerator device 100 may comprise any type and form of computing device, including gateways, switches, routers, hubs, firewalls, access points, edge caches, proxies, network address translators (NATs), load balancers, network accelerators, WAN virtualizers, or other such devices for pre-fetching and delivering content to requesting clients. Accelerator device 100 may be a physical device, such as an appliance, rackmount server, desktop server, workstation, embedded device, or other such devices. In other implementations, accelerator device 100 may be a virtual device executed by a physical device, such as a virtual machine or virtual appliance. In many implementations, accelerator device 100 may comprise a plurality of devices, such as a cluster of appliances, server farm, cloud, or other such deployment. Although shown deployed intermediary to client devices 102 and server 105, in many implementations, an accelerator device 100 may be deployed in parallel with client devices 102 (e.g. connected to a local area network or LAN).

Network 104 may comprise one or more networks of the same or different types, including standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, satellite connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In many implementations, a network 104 may comprise a plurality of networks and intermediary devices (e.g. switches, routers, firewalls, gateways, modems, or other devices not illustrated).

Client devices 102 may comprise desktop computers, laptop computers, portable computers, tablet computers, wearable computers, embedded computers, intelligent appliances or Internet-of-Things (IoT) devices, workstations, servers, virtual machines executed by physical machines, or any other type and form of computing devices. In many implementations, a client device 102 may include an accelerator 100. Client devices 102 may communicate with one or more servers 105 via one or more networks 104. In some implementations, communications may be via accelerator device 100, while in other implementations, communications may be via one or more gateways, switches, firewalls, or other such devices. Client devices 102 may transmit requests to servers 105 and receive responses, and may similarly receive requests and transmit responses. Client devices 102 may also communicate with other client devices 102, either within a local network or via a wide area network.

Servers 105 may comprise desktop computers, laptop computers, portable computers, tablet computers, wearable computers, embedded computers, intelligent appliances or Internet-of-Things (IoT) devices, workstations, servers, virtual machines executed by physical machines, or any other type and form of computing devices. In many implementations, a server 105 may include an accelerator 100. Servers 105 may communicate with one or more client devices 102 via one or more networks 104. In some implementations, communications may be via accelerator device 100, while in other implementations, communications may be via one or more gateways, switches, firewalls, or other such devices. Servers 105 may transmit requests to clients 102 and receive responses, and may similarly receive requests and transmit responses. Servers 105 may also communicate with other servers 105, either within a local network or via a wide area network.

Servers 105 may communicate with and/or include data storage 108, sometimes referred to as content storage, media storage, or by other such terms. Data storage 108 may comprise any type and form of storage device, including solid state or disk-based hard drives, tape drives, Flash memory, or other such devices. In some implementations, servers 105 and data storage 108 may be referred to as applications servers, data servers, content servers, media servers, file servers, or by other such terms. Servers 105 may transmit data, including files, applications, libraries, system components, or any other type and form of data to client devices 102. In many implementations, servers 105 may host content shared by a plurality of client devices 102. For example, client devices 102 may be associated with groups 112A, 112B, referred to generally as a device group or user group 112. A device group 112 may share access rights to the same files or content in data storage 108, such as shared databases or applications. Servers 105 may perform authentication and provide access control to such data. Although shown as a single server 105, in many implementations, multiple servers and data storage 108 may exist in the system. Such servers 105 and data storage 108 may operate together, such as a server farm, cluster, or cloud, or may be independent.

As discussed above, in some implementations, accelerator device 100 may identify data stored in data storage 108 that is frequently accessed or requested by one or more clients 102. The accelerator device 102 may, in some implementations, request the identified data from servers 105, and store the data in a local cache 110. The local cache 110 may comprise any type and form of storage device, including solid state or disk-based hard drives, tape drives, Flash memory, or other such devices. Network connections between accelerator device 100 and client devices 102 may be shorter and/or faster (e.g. LAN connections) compared to connections between client devices 102 and servers 105 (e.g. WAN connections, Virtual Private Network (VPN) connections, etc.). Accordingly, by requesting and caching frequently accessed data in cache 110, accelerator device 100 may provide faster access for the client devices 102 to the data than servers 105. This may be referred to as pre-fetching, as the accelerator device 100 requests or fetches the data before client devices 102 have requested or fetched the data. The client devices 102 may be configured to transmit a query to accelerator 100 for the data, which may respond with the data from its local cache 110 if the data is available (and, in some implementations, recently obtained or "fresh" and non-expired) or forward the request to servers 105. In other implementations, the accelerator 100 may respond that the data is not available, and the client may re-request the data from servers 105.

As discussed above, in many implementations, access to network 104 may be provided by a network connectivity provider or Internet Service Provider (ISP), that may place quotas or limits on network utilization during a time period, such as a maximum amount of data transferred during the time period, a maximum file size to be transferred, a maximum transfer speed, etc. In some implementations, client devices may be allowed to exceed these quotas or limits, either for additional cost, or at reduced transfer speeds. For example, in one such implementation, if more than 100 GB per month of data is uploaded or downloaded via network 104, additional data bandwidth could incur additional cost. In another such implementation, the client devices may be able to upload or download at a first speed, such as 1 Gbps until 100 GB has been transferred during any month, and may then be limited to a second speed, such as 100 Mbps. In some implementations, quotas or limits may be specific to each device 102, to each group of devices 112, or to all of the devices collectively. For example, in some implementations, an enterprise may wish to limit individual device bandwidth utilization during a time period, or wish to limit utilization by a group of devices (e.g. devices of an engineering department).

Pre-fetching of data may count against these quotas or limits. If the pre-fetching results in utilization over the limit, users may incur additional costs or bandwidth may be downgraded, such that acceleration may result in slower transfers. Instead, accelerator 100 may monitor bandwidth utilization during a time period by devices to determine average utilization. The accelerator 100 may then predict, via a machine learning-based regression algorithm, a likely utilization during a subsequent time period. The accelerator 100 may pre-fetch an amount of data such that the predicted utilization plus the pre-fetching utilization is equivalent to the limit (or less than the limit by a predetermined amount, such as 1%, 2%, 5%, 10%, or any other such amount).

For example, given a first device 102A, belonging to a first team 112A, with access to a first server 105, the device 102A may be limited to a maximum of 100 GB per month. The accelerator may monitor access by the device 102A and group 112A, as well as other devices 102, and determine that:

first device 102A on an average uses 40 GB per month;
first group 112A on an average uses 60 GB per month;
devices 102 (including device 102A) accessing the first server 105 on an average consume 55 GB per month; and
first device 102A has historically consumed a maximum of 80 GB in one month;

as well as any other such information. These values may be provided as variable values to the regression algorithm, which may determine a predicted amount of utilization (e.g. 45 GB during the subsequent month by first device 102A). The accelerator 100 may then pre-fetch a corresponding amount of data (e.g. 50 GB for device 102A), such that the total utilization (e.g. 45 GB plus 50 GB) is less than the limited maximum.

Additional independent variables may be used by the regression algorithm, including a number of files to which the device or a user account has access; a total size of files to which the device or a user account has access; a group with which the device is associated; a number of files shared with the device or a user account over a recent time period (e.g. prior month, two months, two weeks, etc.); a total size of files shared with the device or a user account over a recent time period; frequency of user or device activity over a recent time period. The dependent variable identified by the regression algorithm may include the total bandwidth utilized in a subscription cycle or predetermined time period (e.g. one month).

Accordingly, the accelerator 100 may thus provide pre-fetching of content for faster device and user access, providing enhanced experience and better performance, with maximum utilization of the account subscription without incurring additional expense or experiencing bandwidth throttling.

Figure 2A:
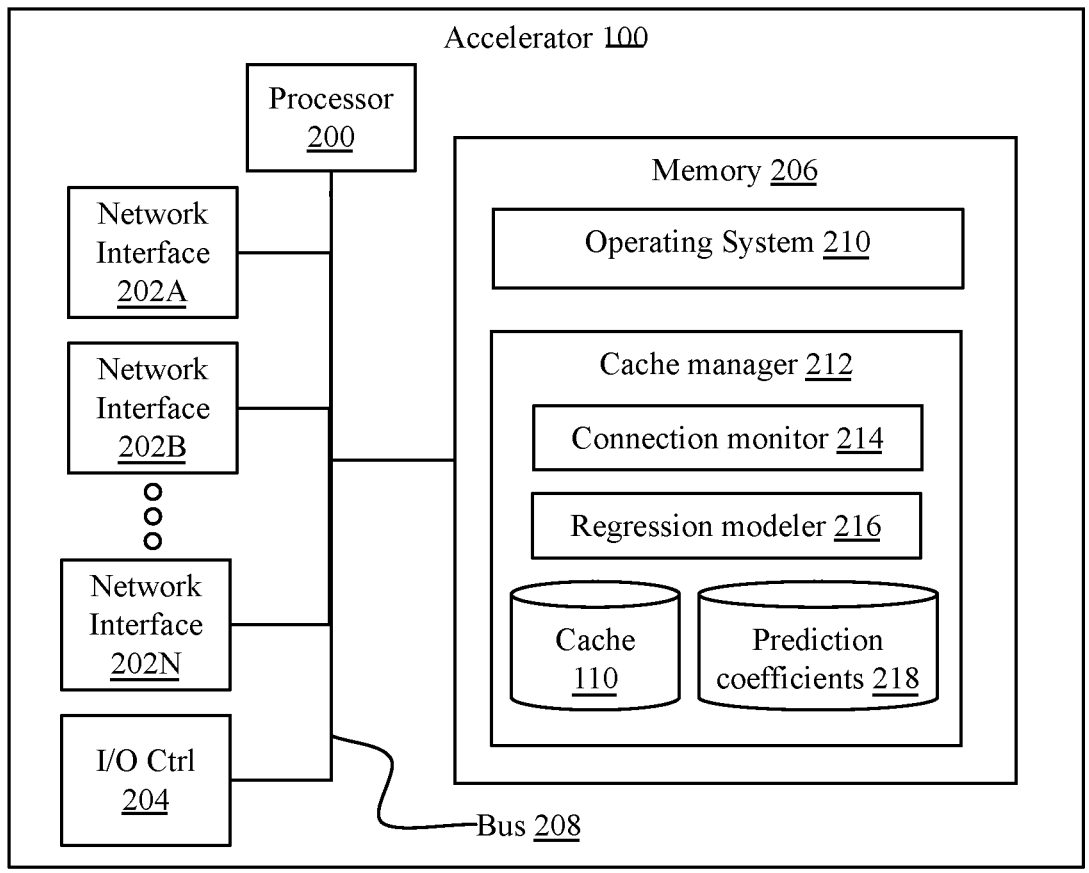
FIG. 2A is a block diagram of an embodiment of an accelerator device.

FIG. 2A is a block diagram of an embodiment of an accelerator device 100. As shown in FIG. 2A, device 100, sometimes referred to as a computing device, router, accelerator, load balancer, WAN virtualizer, gateway, or by any other such terms, may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device may be based on any of these processors, or any other processor capable of operating as described herein.

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAM.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2A. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device may include one or more network interfaces 202A-202N (referred to generally as network interface(s) 202) to interface to a network through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device communicates with other computing devices via any type and/or form of gateway or tunneling protocol such as Secure Socket Layer (SSL) or Transport Layer Security (TLS). The network interface 202 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

An accelerator device 100 of the sort depicted in FIG. 2A may operate under the control of an operating system 210, which controls scheduling of tasks and access to system resources. The routing device can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the routing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the accelerator device can be any workstation, server, appliance, virtual machine, desktop computer, rackmount computer, laptop or notebook computer, handheld computer, mobile telephone or other portable telecommunications device, media playing device, a gaming system, mobile computing device, or any other type and/or form of computing, telecommunications or media device that is capable of communication. The computer system has sufficient processor power and memory capacity to perform the operations described herein.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Accelerator device 100 may comprise a cache manager 212. Although shown as part of memory 206, in many implementations, cache manager 212 may be provided by a network interface 202. For example, a packet processing engine executed by a co-processor of a network interface may perform connection monitoring and cache management. In many implementations, cache manager 212 may be embodied in circuitry, such as application-specific integrated circuits (ASICs), for higher processing speed. Cache manager 212 may comprise hardware, software, or a combination of hardware and software for monitoring bandwidth utilization or other characteristics of a connection of one or more client devices 102, and for pre-fetching content for storage in a cache 110 for subsequent delivery on request to the client devices 102.

Cache manager 212 may comprise a connection monitor 214. Connection monitor 214 may be an application, service, server, daemon, routine, or other executable logic for monitoring a network connection or connections, e.g. to a server and/or client device, for latency, bandwidth, utilization, jitter, loss rates, congestion, or any other type and form of characteristic. Connection monitor 214 may determine average utilization over a predetermined time period, such as an average transmission rate in Mbps over a period, such as a day, week, or month; or an amount of data transferred or bandwidth utilized by a device over the time period. Connection monitor 214 may monitor a plurality of client devices and/or groups of devices, or a single device or group.

Cache manager 212 may comprise a regression modeler 216. Regression modeler 216 may be an application, service, server, daemon, routine, or other executable logic for performing machine learning-based regression modeling and prediction of connection utilization by a client device or devices. Regression modeler 216 may utilize a device profile or set of prediction coefficients for each device or group of devices, and stored in a database or other data storage format 218. Regression modeler 216 may periodically update the device profile or prediction coefficients based on measurements by connection monitor 214.

As discussed above, cache manager 212 may monitor utilization of a connection by a device or devices, including identifying frequently requested or accessed data or data shared with a user or device. Based on measured connection parameters, the cache manager 212 may predict usage during a subsequent time period, and may pre-fetch an amount of frequently requested or accessed data such that the pre-fetched amount and predicted usage amount total less than or equal to a quota or limit for a connection.

Figure 2B:
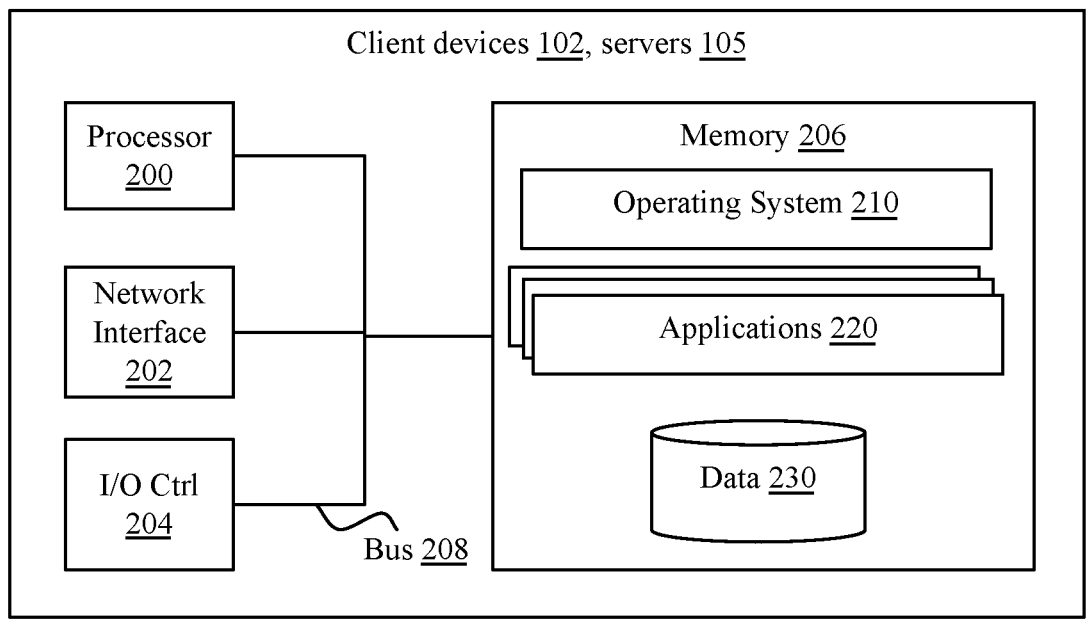
FIG. 2B is a block diagram of an embodiment of computing device.

FIG. 2B is a block diagram of an embodiment of computing device, such as client devices 102 and/or servers 105, as well as other computing devices including client computing devices, server computing devices, workstation devices, cloud computing devices, or any other type and form of computing device, referred to generally herein as a "computing device" or "computing devices". Such devices may include laptop computers, desktop computers, rackmount computers, tablet computers, wearable computers, appliances, cluster devices or appliances, server clouds or farms, virtual machines executed by one or more physical machines, or any other type of computing device.

Client devices 102 and/or servers 105 may include many of the components discussed above, including one or more processors 200, network interfaces 202, I/O controllers 204, memory devices 206, and an operating system 210. Client devices 102 and/or servers 105 may execute one or more applications 220, such as web browsers, media players, video games, productivity software, VoIP software, video chat software, or any other type and form of applications 220. Client devices 102 and/or servers 105 may also include data stores 230, which may be of any type and form, including libraries, databases, data files, flat files, logs, configuration files, installation files, archives, images, videos, audio, or any other type and form of data, including executable instructions or non-executable data.

As discussed above, in many implementations, an accelerator 100 may be a client device 102 or server 105. Accordingly, in such implementations, a client device 102 or server 105 may include a cache manager 212, connection monitor 214, regression modeler 216, cache 110, and prediction coefficients 218.

Referring briefly back to FIG. 2A, although shown internal to cache manager 212 and memory 206, in many implementations, one or more of connection monitor 214, regression modeler 216, cache 110, and/or prediction coefficients 218 may be separate from the cache manager 212 and/or memory 206. For example, in some implementations, a connection monitor and/or regression modeler 216 may be provided or executed by a gateway or router; while pre-fetching and caching of data in cache 110 may be done by each client device 102 according to an identified bandwidth amount provided by regression modeler 216. In another implementation, each client device may comprise a connection monitor 214 and/or may perform measurements of utilization and provide the measurements to a connection monitor or regression modeler 216 of an accelerator 100, which may perform cache management accordingly. In some implementations, cache 110 may be a separate storage device in communication with the client device 102 and/or accelerator 100.

Figure 3:
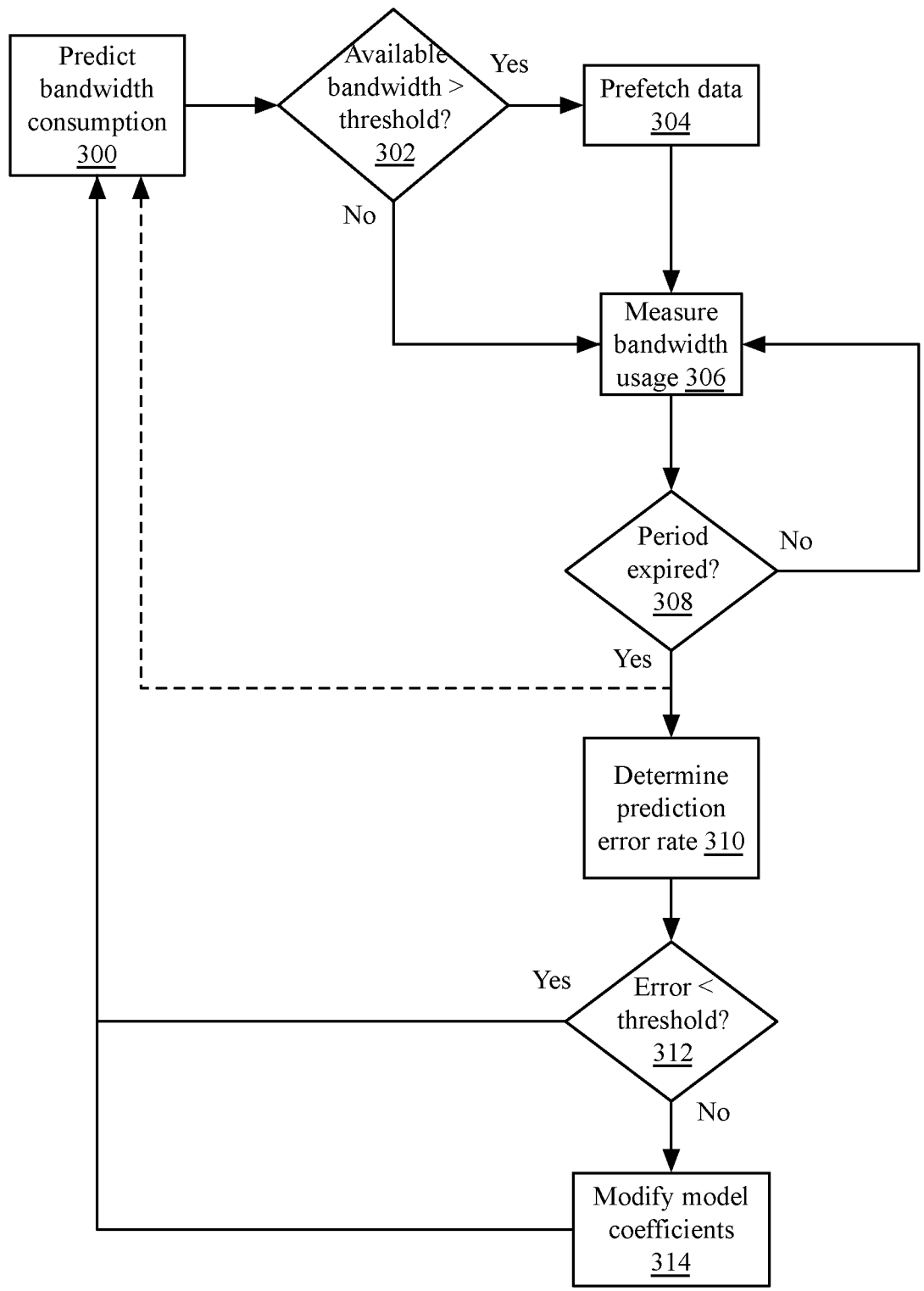
FIG. 3 is a flowchart of an embodiment of a method for bandwidth usage-based content pre-fetching.

FIG. 3 is a flowchart of an embodiment of a method for bandwidth usage-based content pre-fetching. The method shown is an iterative process that improves the prediction coefficients for use in the regression modeler, as discussed above. Utilization data may be provided to the cache manager prior to use or predetermined coefficients may be used for the regression modeling in some implementations. In other implementations, the first iteration of the method may begin at step 306. At step 306, either on the first iteration or on each subsequent iteration, the cache manager may monitor bandwidth utilization and/or other connection characteristics for a client device. The bandwidth utilization may be monitored over a time period, such as a day, a week, or a month, or any other such time, until expiration of the time period at step 308. Accordingly, as shown, steps 308-306 may be repeated until the time period has ended.

At step 310, in some implementations, a prediction error rate may be determined as a difference between the predicted bandwidth utilization (or default values, in a first iteration in some implementations) and the measured bandwidth utilization, either as an amount of bandwidth or as a percentage of the predicted bandwidth or measured utilization. For example, in many implementations, the cache manager may predict utilization of an amount, such as 50 GB/month, and the device may utilize a slightly different amount (e.g. 52 GB/month, or 4% error). At step 312, if the error is less than a predetermined threshold (e.g. 5%, 10%, 2%, or any other such threshold value), then the cache manager may predict utilization in a subsequent time period. Otherwise, at step 314, the cache manager may update regression coefficients based on the measured bandwidth and/or other independent variables as discussed above, such that a subsequent utilization prediction would equal the measured utilization.

In some implementations, such as where the method starts with step 306 during a first iteration or where default coefficients are used during a first iteration, steps 310 and 312 may be skipped, and the cache manager may update the coefficients at step 314.

At step 300, the cache manager may predict an amount of bandwidth that will likely be consumed during a subsequent time period. As discussed above, the cache manager may calculate the predicted bandwidth based on a regression model with independent variables of measured bandwidth utilization for a device or group of devices; a number of files to which the device or a user account has access; a total size of files to which the device or a user account has access; a group with which the device is associated; a number of files shared with the device or a user account over a recent time period (e.g. prior month, two months, two weeks, etc.); a total size of files shared with the device or a user account over a recent time period; and/or a frequency of user or device activity over a recent time period.

At step 302, the cache manager may determine whether the predicted utilization is less than a quota or threshold limit for the connection, device, or group; or whether the predicted utilization is greater than the quota or threshold limit for the connection, device, or group. In some implementations, cache manager may determine whether a sum of the predicted utilization and a safety factor or prediction error control value is less than or greater than the quota or threshold limit. For example, given a limit of 100 GB/month and a predicted utilization of 90 GB during the subsequent month, if the prediction is correct, then 10 GB of data may be pre-fetched. However, if all 10 GB are pre-fetched and the prediction is wrong and the device or group actually utilizes 91 GB, then the connection may be throttled or additional cost incurred. Accordingly, in some such implementations, a safety factor may be applied of either a given amount (e.g. 5 GB) or a percentage (e.g. 5% of the predicted value). In such implementations, at step 302, the cache manager may determine whether the predicted utilization plus the safety factor or prediction error control value is less than the threshold or quota. In a similar implementation, the cache manager may determine whether an amount of available bandwidth (e.g. a connection limit value minus the predicted utilization, plus a safety factor if applicable), exceeds a threshold.

If the predicted utilization (and safety factor, in some implementations), is less than the threshold, or if the available bandwidth exceeds the threshold, then at step 304, the cache manager may pre-fetch an amount of data equal to the difference between the quota and the predicted utilization (or the predicted utilization plus the safety factor, in some implementations). The data to be pre-fetched may be selected from frequently accessed or utilized data in one or more prior time periods. Accordingly, the cache manager may dynamically select data, in a dynamically adjusted amount, to be pre-fetched based on past utilization.

If the predicted utilization (and safety factor, in some implementations), is equal to or greater than the threshold or the available bandwidth is less than the threshold, then there may be insufficient available utilization to pre-fetch data, and accordingly, the cache manager may skip to measuring bandwidth utilization during the next time period at step 306, without pre-fetching data.

As discussed above, in many implementations, the cache manager may apply the predictive pre-fetching to multiple devices and/or groups of devices. Accordingly, in such implementations, the method or portions of the method may be run in parallel or iteratively for different devices. For example, steps 300-304 may be repeated iteratively for each of a plurality of devices until all predictions have been performed and data pre-fetched. In other implementations, these steps may be run in parallel by different processing threads or cores of a multi-processor device or multi-threaded processor.

Accordingly, the systems and methods discussed herein provide for faster access to frequently utilized resources through intelligent bandwidth usage-based content pre-fetching. An intelligent acceleration and caching device may monitor bandwidth utilization over a time period and create a regression-based model to predict bandwidth utilization in subsequent time periods. When predicted utilization is below a threshold, the device may pre-fetch frequently accessed content, providing low-latency access and faster performance, without exceeding connection allocation limits.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A system for bandwidth usage-based content pre-fetching by a cache manager, comprising:
    a network device comprising a storage device, a network interface in communication with one or more client devices, a connection monitor, and a cache manager;
    wherein the connection monitor is configured to measure bandwidth used by the one or more client devices during a first predetermined time period; and
    wherein the cache manager is configured to:
        identify a difference between the measured bandwidth used by the one or more client devices during the first predetermined time period and a predetermined bandwidth limit,
        determine a difference between the measured bandwidth used by the one or more client devices during the first predetermined time period and a predicted amount of bandwidth to be used by the one or more client devices during the first predetermined time period, based on a measured bandwidth used by the one or more client devices during one or more previous time periods,
        calculate a prediction error between the determined difference and the identified difference, and
        pre-fetch, during a second predetermined time period, an amount of data corresponding to the identified difference, the amount of data selected responsive to the calculated prediction error being less than a threshold, the pre-fetched data stored in the storage device to be provided to the one or more client devices.

2. The system of claim 1, wherein the cache manager is further configured to, iteratively for a plurality of subsequent predetermined time periods:
    identify a further difference between the measured bandwidth used by the one or more client devices during a prior predetermined time period and the predetermined bandwidth limit, and
    pre-fetch, during said subsequent predetermined time period, an amount of data corresponding to the identified further difference.

3. The system of claim 1, wherein the cache manager is further configured to determine the predicted difference via a regression model incorporating the measured bandwidth used by the one or more client devices during each of the one or more predetermined time periods.

4. The system of claim 1, wherein the cache manager is further configured to select data for pre-fetching from a set of data frequently requested by the one or more client devices.

5. The system of claim 1, wherein the cache manager is further configured to select data for pre-fetching from a predetermined set of data for which the one or more client devices are authorized to access.

6. The system of claim 1, wherein the connection monitor is further configured to monitor a number of files accessed by the one or more client devices during the first predetermined time period; and wherein the cache manager is further configured to select data for pre-fetching based on the number of files accessed by the one or more client devices.

7. The system of claim 1, wherein the connection monitor is further configured to monitor a total size of data accessed by the one or more client devices during the first predetermined time period; and wherein the cache manager is further configured to identify the difference between the measured bandwidth and the predetermined bandwidth limit based on the total size of data accessed during the first predetermined time period and a predetermined data limit.

8. The system of claim 1, wherein the network device is deployed as an intermediary between the one or more client devices and one or more servers.

9. The system of claim 1, wherein the connection monitor is configured to receive bandwidth measurements for the one or more client devices from a second device.

10. A method for bandwidth usage-based content pre-fetching by a cache manager, comprising:
    measuring bandwidth used by one or more client devices during a first predetermined time period, by a connection monitor of a network device in communication with the one or more client devices;
    identifying, by a cache manager of the network device, a difference between the measured bandwidth used by the one or more client devices during the first predetermined time period and a predetermined bandwidth limit;
    determining, by the cache manager, a difference between the measured bandwidth used by the one or more client devices during the first predetermined time period and a predicted amount of bandwidth to be used by the one or more client devices during the first predetermined time period, based on a measured bandwidth used by the one or more client devices during one or more previous time periods;
    calculating, by the cache manager, a prediction error between the determined difference and the identified difference; and
    pre-fetching, by the cache manager during a second predetermined time period, an amount of data corresponding to the identified difference, the amount of data selected responsive to the calculated prediction error being less than a threshold, the pre-fetched data stored in a storage device of the network device to be provided to the one or more client devices.

11. The method of claim 10, further comprising, iteratively for a plurality of subsequent predetermined time periods:

identifying, by the cache manager, a further difference between the measured bandwidth used by the one or more client devices during a prior predetermined time period and the predetermined bandwidth limit; and pre-fetching, by the cache manager, during said subsequent predetermined time period, an amount of data corresponding to the identified further difference.

12. The method of claim 10, further comprising determining, by the cache manager, the predicted difference via a regression model incorporating the measured bandwidth used by the one or more client devices during each of the one or more predetermined time periods.

13. The method of claim 10, further comprising selecting, by the cache manager, data for pre-fetching from a set of data frequently requested by the one or more client devices.

14. The method of claim 10, further comprising selecting, by the cache manager, data for pre-fetching from a predetermined set of data for which the one or more client devices are authorized to access.

15. The method of claim 10, further comprising:

monitoring, by the connection manager, a number of files accessed by the one or more client devices during the first predetermined time period; and selecting, by the cache manager, data for pre-fetching based on the number of files accessed by the one or more client devices.

16. The method of claim 10, further comprising:

monitoring, by the connection monitor, a total size of data accessed by the one or more client devices during the first predetermined time period; and identifying, by the cache manager, the difference between the measured bandwidth and the predetermined bandwidth limit based on the total size of data accessed during the first predetermined time period and a predetermined data limit.

17. The method of claim 10, wherein the network device is deployed as an intermediary between the one or more client devices and one or more servers.

18. The method of claim 10, further comprising receiving, by the connection monitor, bandwidth measurements for the one or more client devices from a second device.

\* \* \* \* \*